United States Patent
Casura et al.

(10) Patent No.: US 12,055,250 B2
(45) Date of Patent: Aug. 6, 2024

(54) FLUID COUPLINGS

(71) Applicant: Colder Products Company, Roseville, MN (US)

(72) Inventors: Matthew G. Casura, St. Anthony, MN (US); Nicholas B. Czechowski, Minneapolis, MN (US); Neal W. Feldhahn, Oak Park Heights, MN (US); Gary J. Harris, Maple Grove, MN (US); Samuel M. Jang, Woodbury, MN (US); Andrew M. Quick, St. Paul, MN (US); Loi T. Truong, Savage, MN (US); Krista A Vangsgard, Oakdale, MN (US)

(73) Assignee: Colder Products Company, Roseville, MN (US)

( * ) Notice: Subject to any disclaimer, the term of this patent is extended or adjusted under 35 U.S.C. 154(b) by 108 days.

(21) Appl. No.: 17/967,657

(22) Filed: Oct. 17, 2022

(65) Prior Publication Data
US 2023/0121092 A1 Apr. 20, 2023

Related U.S. Application Data

(60) Provisional application No. 63/256,971, filed on Oct. 18, 2021.

(51) Int. Cl.
*F16L 37/00* (2006.01)
*F16L 37/23* (2006.01)
*F16L 37/35* (2006.01)

(52) U.S. Cl.
CPC .............. *F16L 37/23* (2013.01); *F16L 37/35* (2013.01)

(58) Field of Classification Search
CPC .......... F16K 27/041; F16K 3/26; F16K 3/265; F16L 37/35; F16L 37/107
See application file for complete search history.

(56) References Cited

U.S. PATENT DOCUMENTS

| | | | |
|---|---|---|---|
| 5,848,608 A | 12/1998 | Ishigaki | |
| 5,975,491 A | 11/1999 | Mann | |
| 6,962,321 B1 | 11/2005 | Savage et al. | |
| 11,703,132 B2* | 7/2023 | Pereira | F16K 3/265 251/329 |
| 2018/0163892 A1* | 6/2018 | Carpignano | F16K 31/1223 |

OTHER PUBLICATIONS

International Search Report and Written Opinion in International Appln. No. PCT/US2022/046889, mailed on Jan. 31, 2023, 7 pages.

\* cited by examiner

*Primary Examiner* — P. Macade Nichols
(74) *Attorney, Agent, or Firm* — Fish & Richardson P.C.

(57) ABSTRACT

Fluid coupling devices described herein can used in a bioprocessing facility, for example. In some cases, the fluid coupling devices can be used to couple bioprocessing equipment to a media source in a sterilized environment. The fluid coupling devices can include a two-position valve that is manually actuatable and reconfigurable between a first configuration and a second configuration.

20 Claims, 15 Drawing Sheets

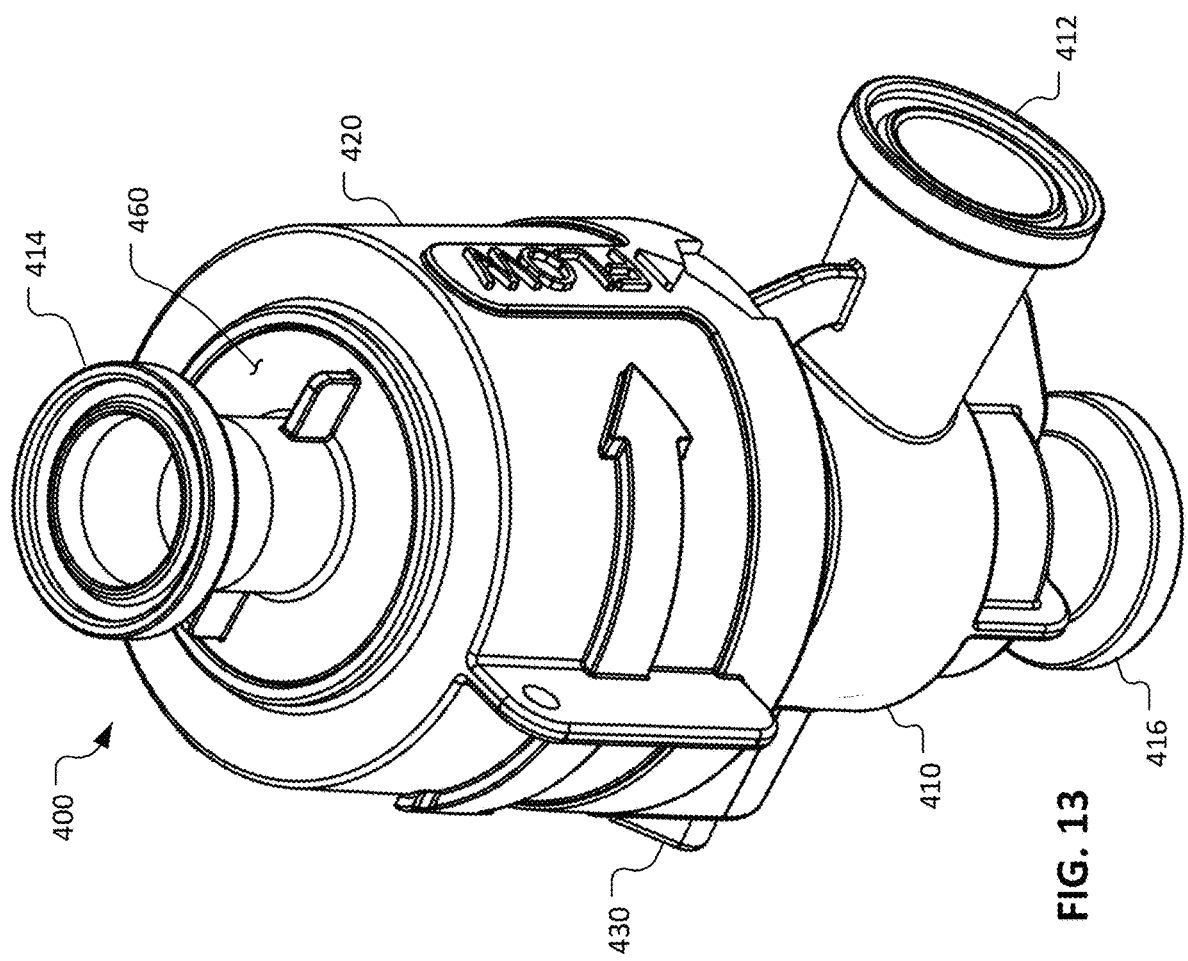

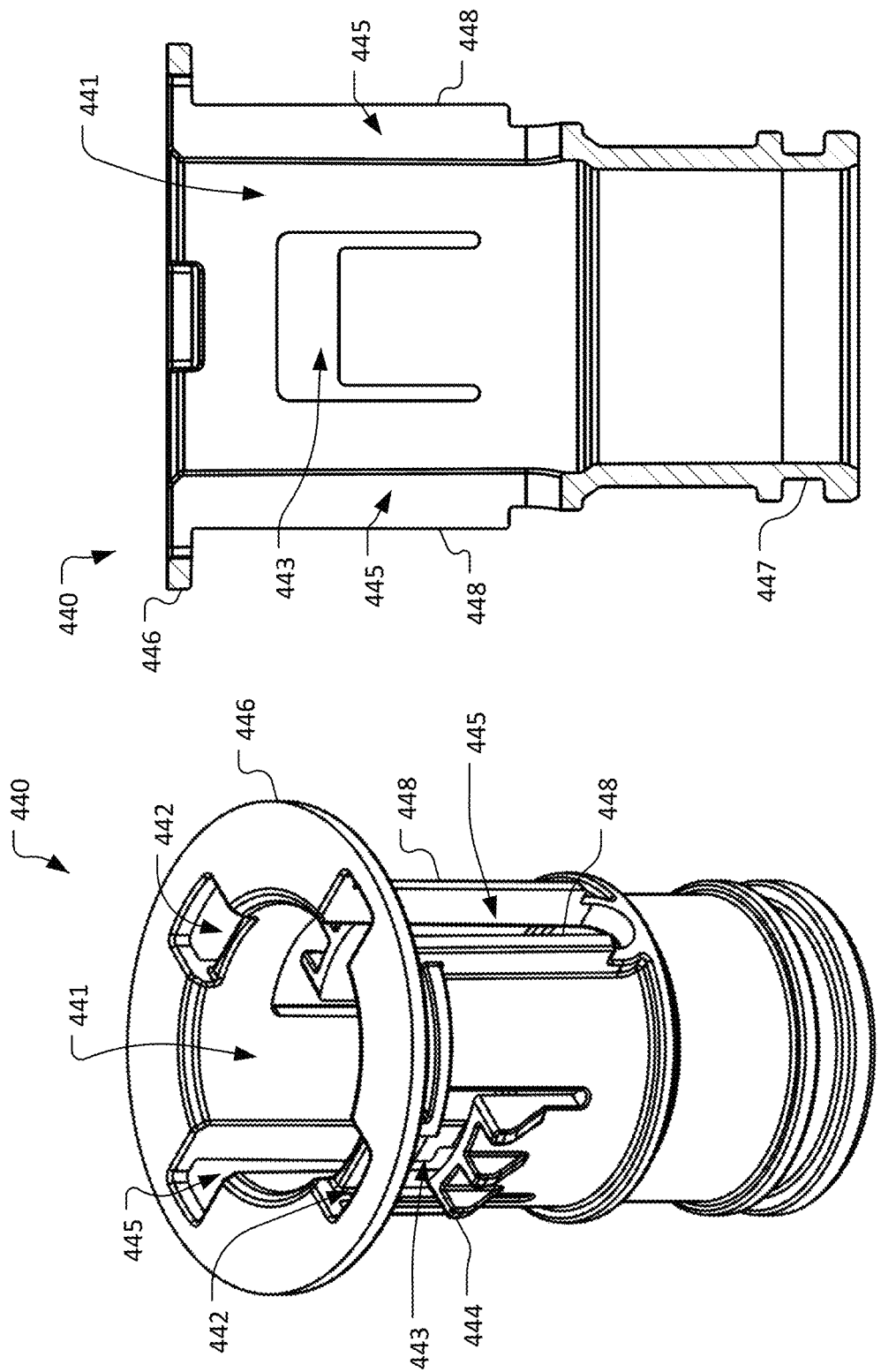

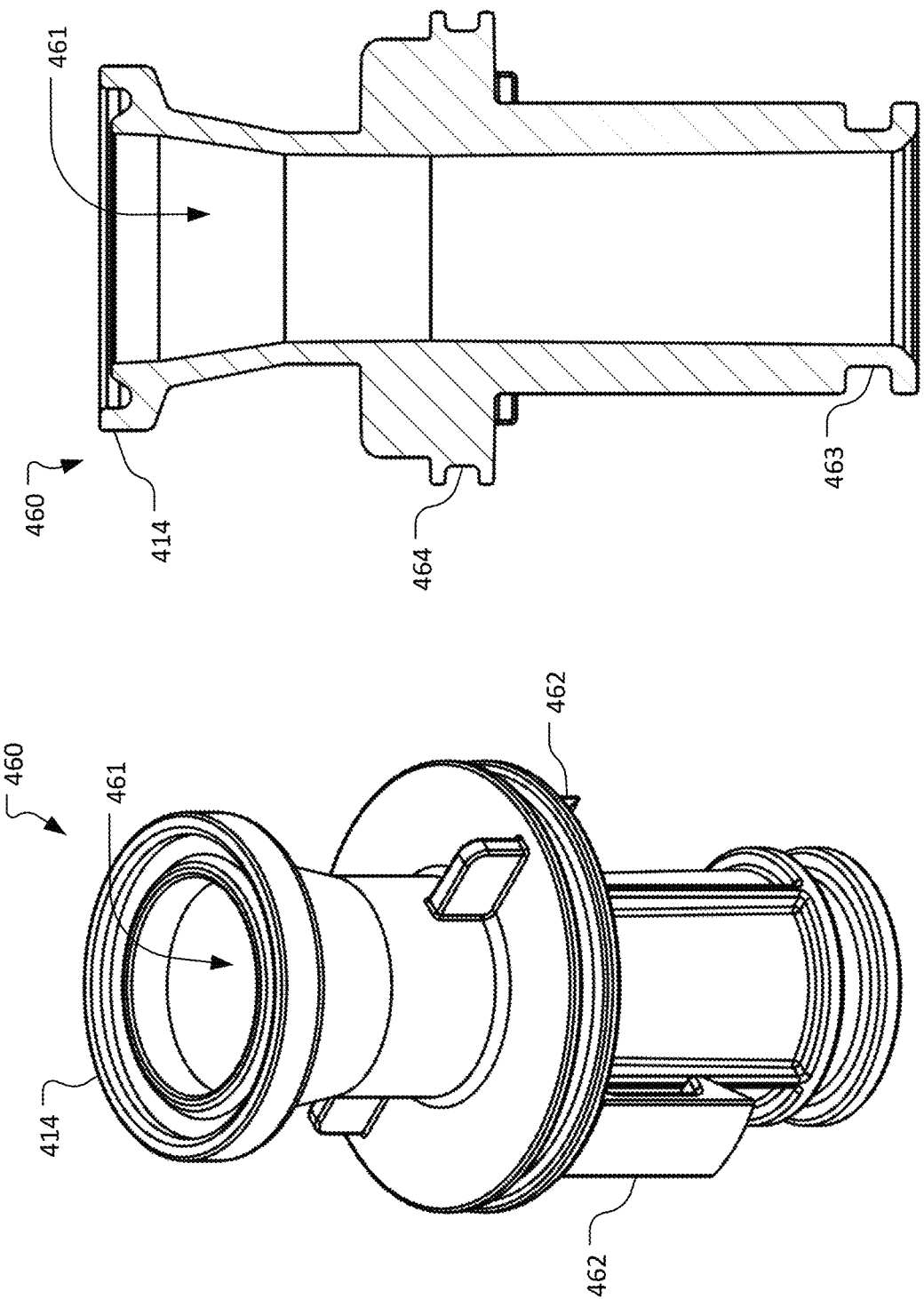

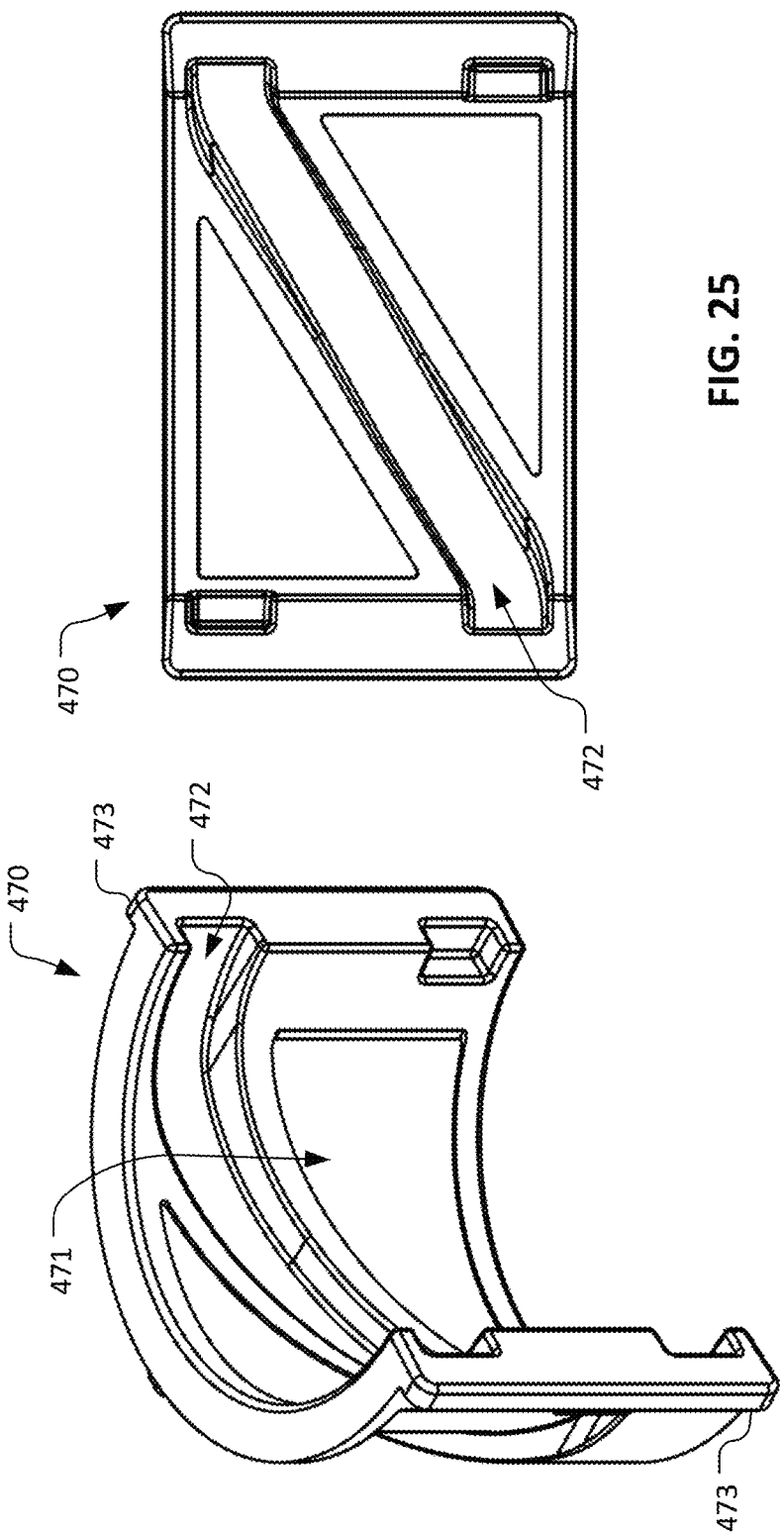

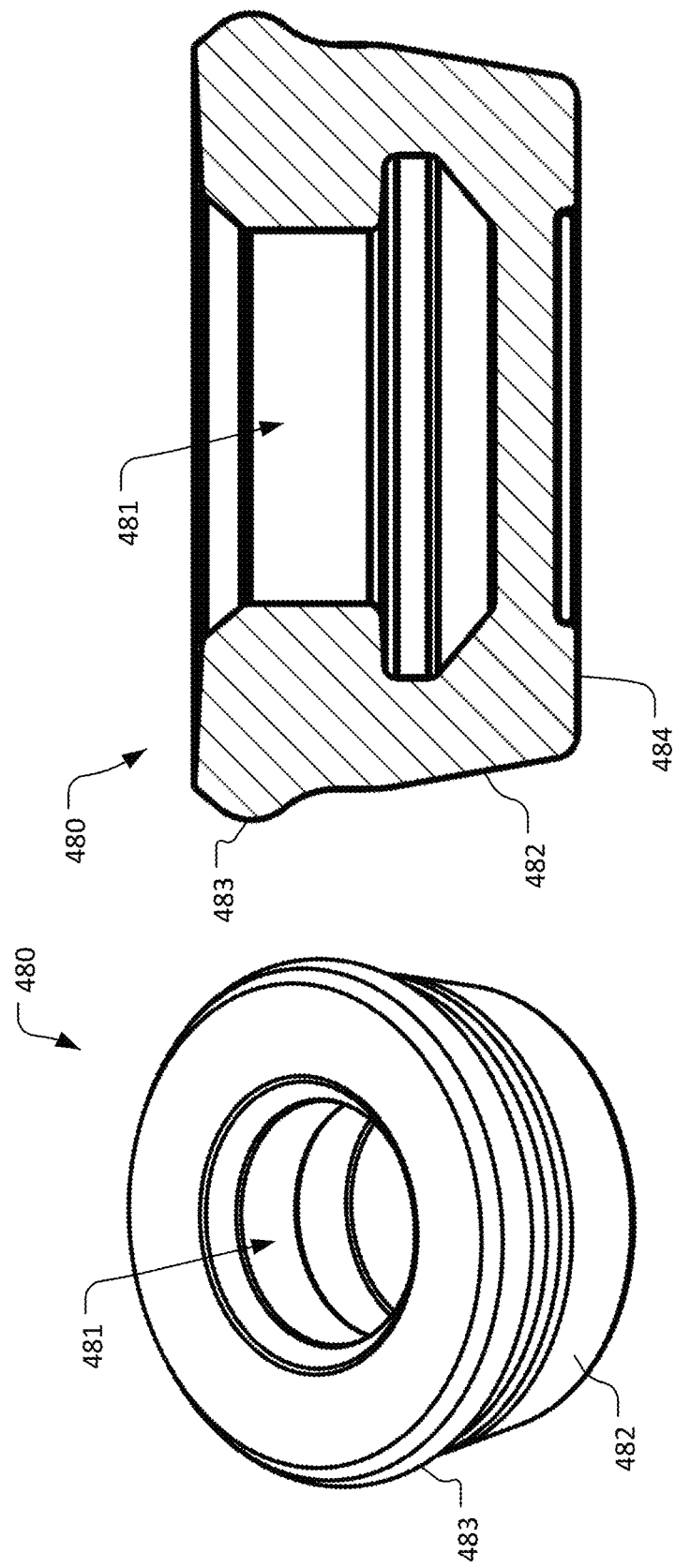

FLUID COUPLINGS

CROSS-REFERENCE TO RELATED APPLICATIONS

This application claims the benefit of U.S. Provisional Application Ser. No. 63/256,971, filed Oct. 18, 2021. The disclosure of the prior application is considered part of (and is incorporated by reference in) the disclosure of this application.

BACKGROUND

1. Technical Field

This document relates to fluid handling couplings.

2. Background Information

Fluid handling components such as fluid couplings allow fluid communication between two or more components. Some fluid couplings include one or more internal valve components that selectively block or allow flow of fluid through the coupling.

Bioprocessing systems are widely used for culturing biomaterial or producing and designing drugs used in pharmaceutical applications. Typically, these systems employ bioreactors and media dispensers connected by tube and valve assemblies. Multiple steam traps and a flow hood are often incorporated to sterilize the system from contaminants. Typically, bioreactors or culture environments and media dispensers have consisted of large vats for producing such biomaterials. Typically, the components used in the assembly were reusable stainless steel components. However, this can require a complex and time consuming coupling procedure. In addition, flow hoods, such as laminar flow hoods, can be cumbersome and inconvenient as they are moved in and out of the processing environment. As more specific cultures and designer drugs are being produced, and as more specific growth media provided to a bioreactor are being developed, there is a need for an improved and less complex bioprocessing system.

SUMMARY

This document describes fluid coupling devices for fluid systems and methods. In some embodiments, this document describes fluid coupling devices that are suitable for coupling a media source to a bioreactor in a sterilized environment.

In one aspect, this disclosure is directed to fluid coupling devices that include a main body, a termination body, a guide sleeve, a valve member, a seal, and an open cylindrical rotary driver. The main body defines: (i) an open internal space, (ii) a valve seat, and (iii) a longitudinal axis. The main body comprises a first fluid conduit connection location and a second fluid conduit connection location. The termination body comprises a third fluid conduit connection location. The guide sleeve defines an open internal space. A portion of the guide sleeve is immovably coupled within the open internal space of the main body. A portion of the termination body is immovably coupled within the open internal space of the guide sleeve. The guide sleeve defines two longitudinally extending wall slots. The valve member is reconfigurable between a first configuration and a second configuration. The valve member defines an open internal space and comprises two radially extending projections. A portion of the termination body is movably coupled within the open internal space of the valve member. The seal is attached to an end portion of the valve member and is configured to seal within the valve seat of the main body when the valve member is in the first configuration and within the open internal space of the guide sleeve when the valve member is in the second configuration. The open cylindrical rotary driver is disposed around a portion of the main body and is rotatable around the portion of the main body. An inner wall of the open cylindrical rotary driver defines two spiral grooves that spirally extend along the inner wall of the open cylindrical rotary driver. The two radially extending projections of the valve member extend through the two longitudinally extending wall slots of the guide sleeve and are slidably disposed within the two spiral grooves of the open cylindrical rotary driver.

Such a fluid coupling device may optionally include one or more of the following features. The fluid coupling device may also include a collar immovably coupled with the open cylindrical rotary driver and being rotatable around the portion of the main body. The fluid coupling device may also include a latch member that is: (i) movably coupled with the main body, (ii) releasably coupleable with the collar, and (iii) reconfigurable between a latched position and an unlatched position. The collar may define two latch engagement recesses that are configured to releasably receive a portion of the latch member when the latch member is in the latched position. In some embodiments, a location of a first latch engagement recess of the two latch engagement recesses corresponds with the first configuration of the valve member, and a location of a second latch engagement recess of the two latch engagement recesses corresponds with the second configuration of the valve member. The fluid coupling device may also include a first seal disposed between the collar and the termination body. The fluid coupling device may also include a second seal disposed between the collar and the main body. The fluid coupling device may also include a third seal disposed between the termination body and the valve member. The fluid coupling device may also include a fourth seal disposed between the valve member and the guide sleeve. The fluid coupling device may also include a fifth seal disposed between the guide sleeve and the main body. In some embodiments, the valve member is movably coupled within the open internal space of the guide sleeve. In some embodiments, while the valve member is in its first configuration, the first fluid conduit connection location is in fluid communication with the third fluid conduit connection location and the second fluid conduit connection location is dead-ended. In some embodiments, while the valve member is in its second configuration, the first fluid conduit connection location is in fluid communication with the second fluid conduit connection location and the third fluid conduit connection location is dead-ended. The main body may define two longitudinally extending wall slots. The two radially extending projections of the valve member may extend through the two longitudinally extending wall slots of the main body.

In another aspect, this disclosure is directed to a fluid coupling device that includes a main body, a guide sleeve, a valve member, a seal, and an open cylindrical rotary driver. The main body defines: (i) an open internal space, (ii) a valve seat, and (iii) a longitudinal axis. The main body comprises a first fluid conduit connection location and a second fluid conduit connection location. The guide sleeve defines an open internal space and one or more longitudinally extending wall slots. The valve member is reconfigurable between a first configuration and a second configuration. The valve member defines an open internal space and comprises one or more radially extending projections. The seal is attached to an end portion of the valve member and configured to seal within the valve seat of the main body when the valve member is in the first configuration and within the open internal space of the guide sleeve when the valve member is in the second configuration. The open cylindrical rotary driver is rotatable relative to the main body and defines one or more spiral grooves. The one or more radially extending projections of the valve member extend through the one or more longitudinally extending wall slots of the guide sleeve and are slidably disposed within the one or more spiral grooves of the open cylindrical rotary driver.

Such a fluid coupling device may optionally include one or more of the following features. The fluid coupling device may also include a termination body comprising a third fluid conduit connection location. A portion of the termination body may be immovably coupled within the open internal space of the guide sleeve. A portion of the termination body may be movably coupled within the open internal space of the valve member. A portion of the guide sleeve may be immovably coupled within the open internal space of the main body. The fluid coupling device may also include a latch member that is: (i) movably coupled with the main body and (ii) reconfigurable between a latched position and an unlatched position. The fluid coupling device may also include a collar immovably coupled with the open cylindrical rotary driver. The collar may define two latch engagement recesses that are configured to releasably receive a portion of the latch member when the latch member is in the latched position. The valve member may be movably coupled within the open internal space of the guide sleeve. Rotation of the open cylindrical rotary driver are configured to drive longitudinal translations of the valve member between the first and second configurations of the valve member.

An advantage of the fluid coupling devices described herein is that the employment of a connector apparatus can greatly simplify the parts of a coupling mechanism in a bioprocessing system. Further, it can minimize the need for cumbersome laminar flow hoods and complex valve assemblies that may use multiple steam traps. Further, multiple exchanges can be accomplished between a piece of bioprocessing equipment and several media sources while maintaining the sterility of the bioprocessing equipment and connector apparatus.

The fluid coupling devices described herein can be used once or multiple times, as desired. Further, multiple exchanges can be accomplished between a piece of bioprocessing equipment and several media sources while maintaining the sterility of the bioprocessing equipment and connector apparatus.

Further, the fluid coupling devices described herein provide a more convenient and practical way of connecting bioprocessing equipment with a media source. In addition, the fluid coupling devices described herein provide a versatile means for coupling that can be easily modified to accommodate a range of needs with respect to particular biomaterials processed.

In the context of this disclosure, the term "fluid" means any substance that can be made to flow including, but is not limited to, liquids, gases, granular or powdered solids, mixtures or emulsions of two or more fluids, suspensions of solids within liquids or gases, etc.

As used herein, the term "sterilize" means a process of freeing, to a specified degree, a surface or volume from microorganisms. In example embodiments, the sterility of various components can be achieved using one or more sterilization techniques, including gamma irradiation, E-beam, ethylene oxide (EtO), and/or autoclave technologies. As used herein, the term "aseptic" refers to any process that maintains a sterilized surface or volume. As used herein, the term "fluid" means any substance that can be made to flow including, but is not limited to, liquids, gases, granular or powdered solids, mixtures or emulsions of two or more fluids, suspensions of solids within liquids or gases, etc.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described herein. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description herein. Other features, objects, and advantages of the invention will be apparent from the description and drawings, and from the claims.

DESCRIPTION OF THE DRAWINGS

FIG. 13 is a perspective view of another example fluid coupling in accordance with some embodiments provided herein.

FIG. 18 is a perspective view of a guide sleeve of the fluid coupling of FIG. 13.

FIG. 19 is a longitudinal cross-sectional view of the guide sleeve of FIG. 18.

FIG. 20 is a perspective view of a termination body of the fluid coupling of FIG. 13.

FIG. 21 is a longitudinal cross-sectional view of the main body of FIG. 20.

FIG. 24 is a perspective view of a rotary driver of the fluid coupling of FIG. 13.

FIG. 25 is an internal side view of the rotary driver of FIG. 24.

FIG. 28 is a perspective view of a seal of the fluid coupling of FIG. 13.

FIG. 29 is a longitudinal cross-sectional view of the seal of FIG. 28.

Like reference numbers represent corresponding parts throughout.

DETAILED DESCRIPTION

Figure 2:
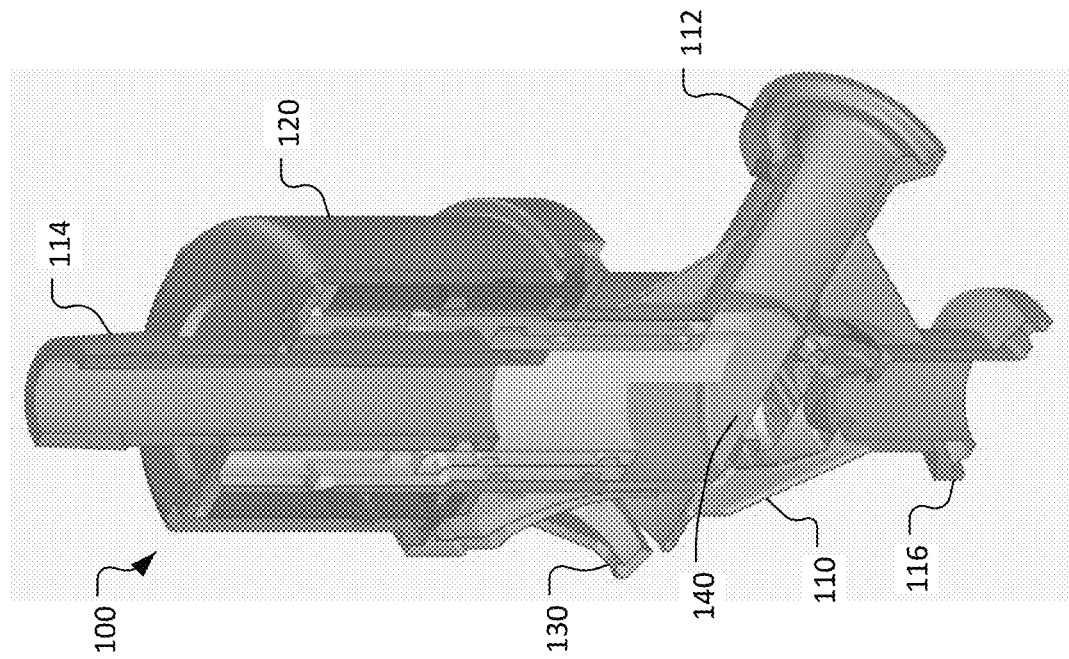
FIG. 2 is a longitudinal cross-sectional view of the fluid coupling of FIG. 1.
Figure 1:
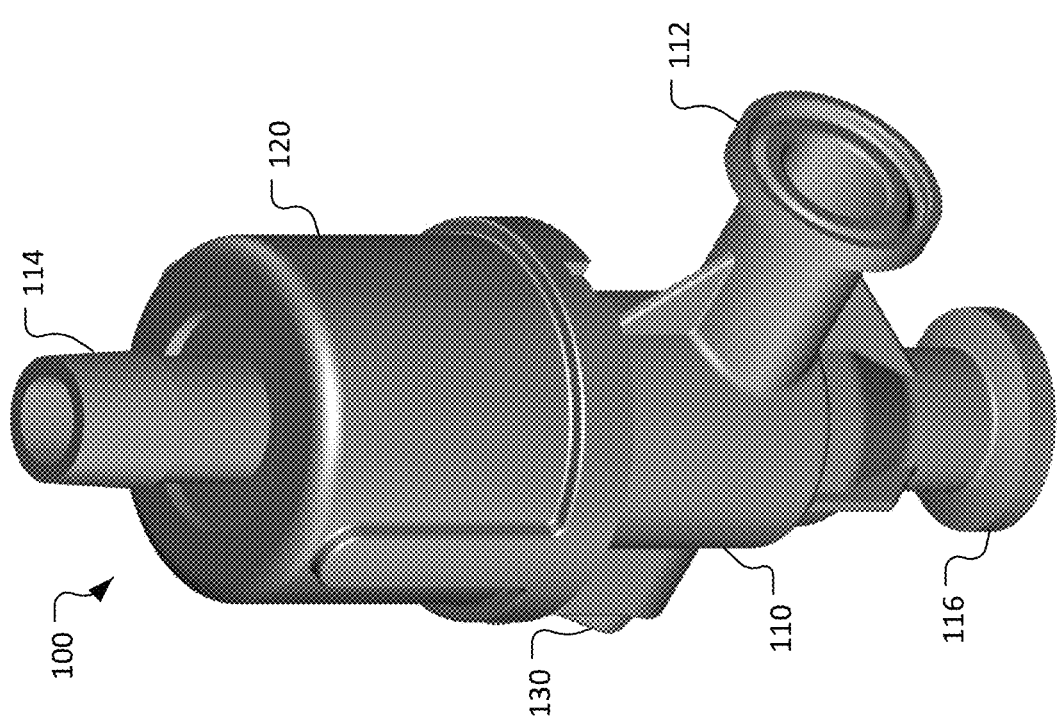
FIG. 1 is a first perspective view of an example fluid coupling in accordance with some embodiments provided herein.
Figure 4:
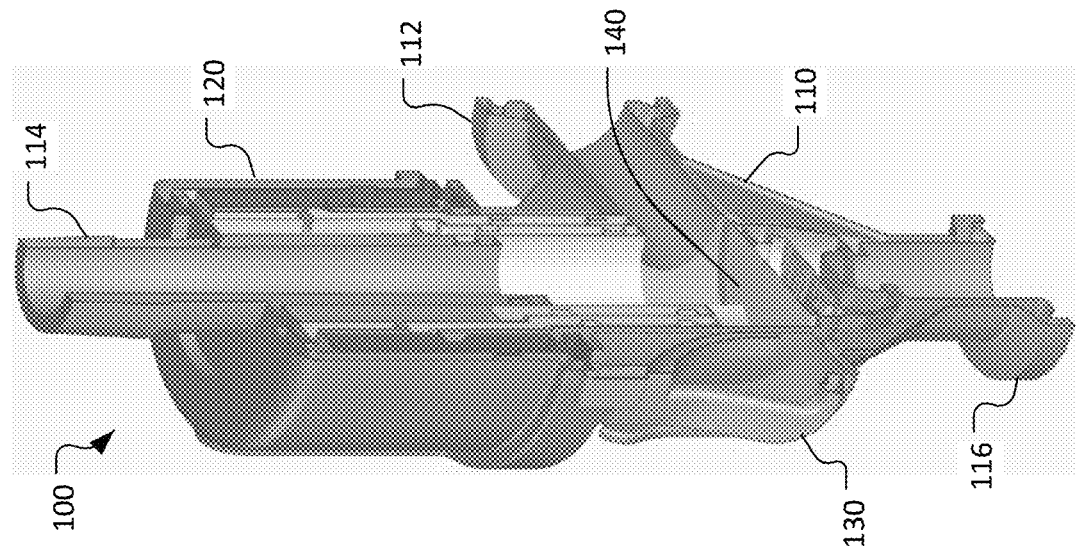
FIG. 4 is a longitudinal cross-sectional view of the fluid coupling of FIG. 3.
Figure 3:
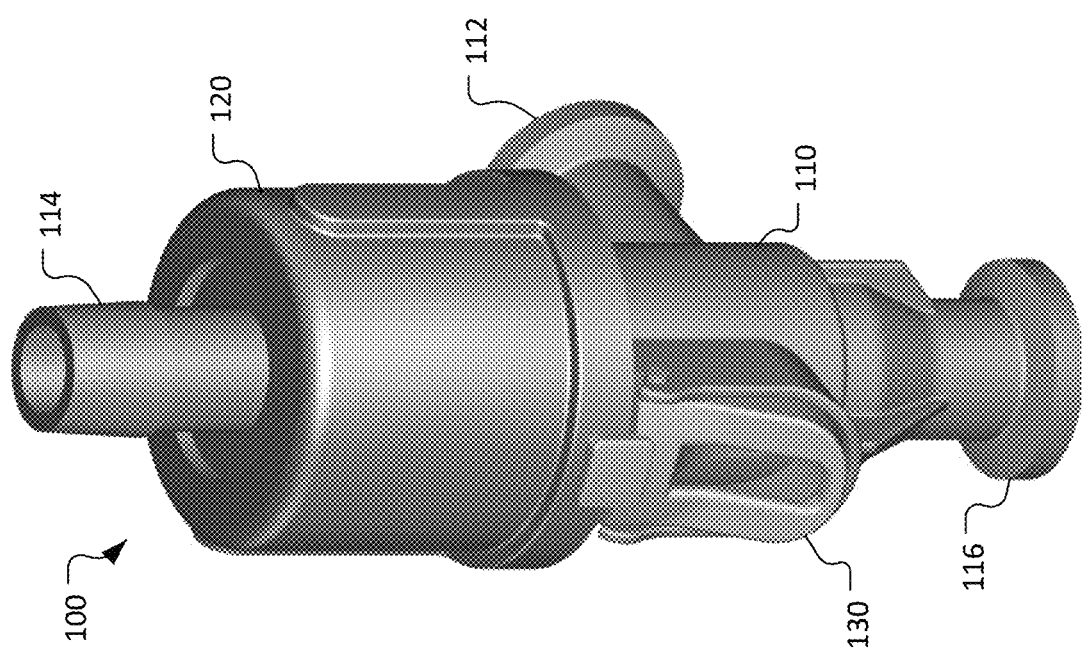
FIG. 3 is a second perspective view of the fluid coupling of FIG. 1.
Figure 6:
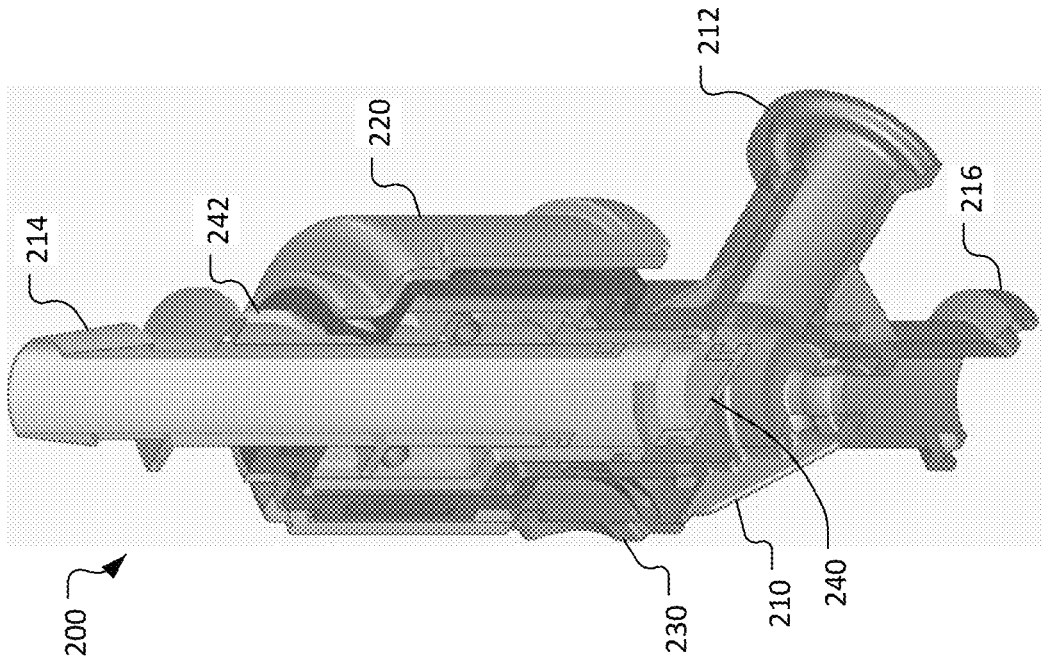
FIG. 6 is a longitudinal cross-sectional view of the fluid coupling of FIG. 5.
Figure 5:
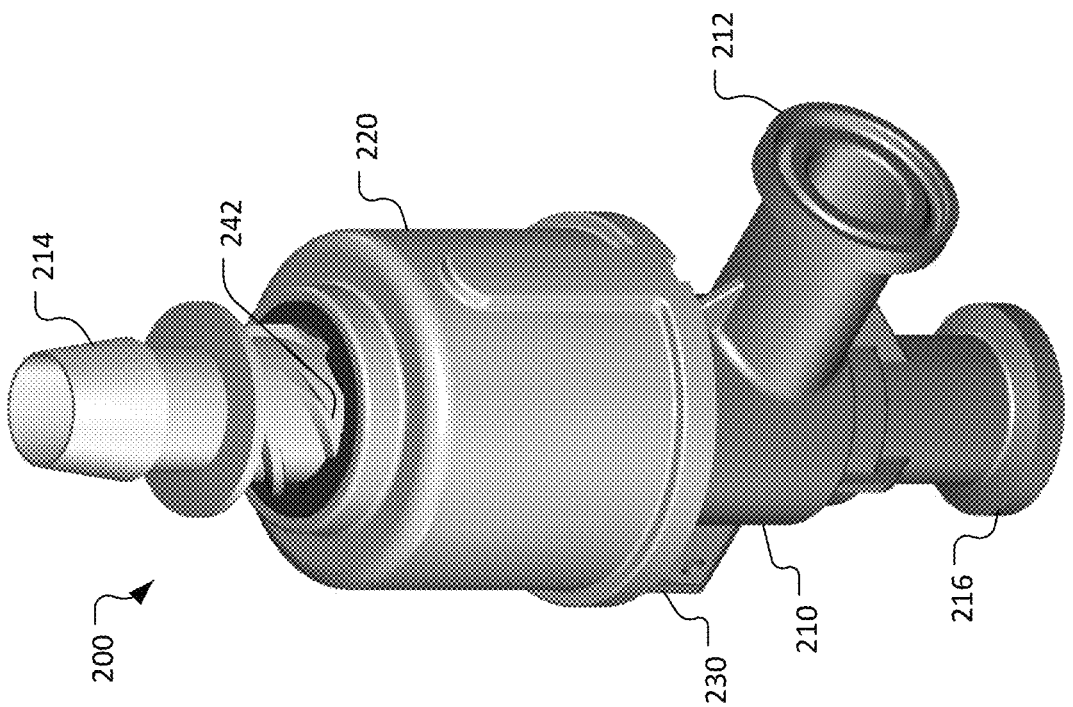
FIG. 5 is a first perspective view of another example fluid coupling in accordance with some embodiments provided herein.
Figure 8:
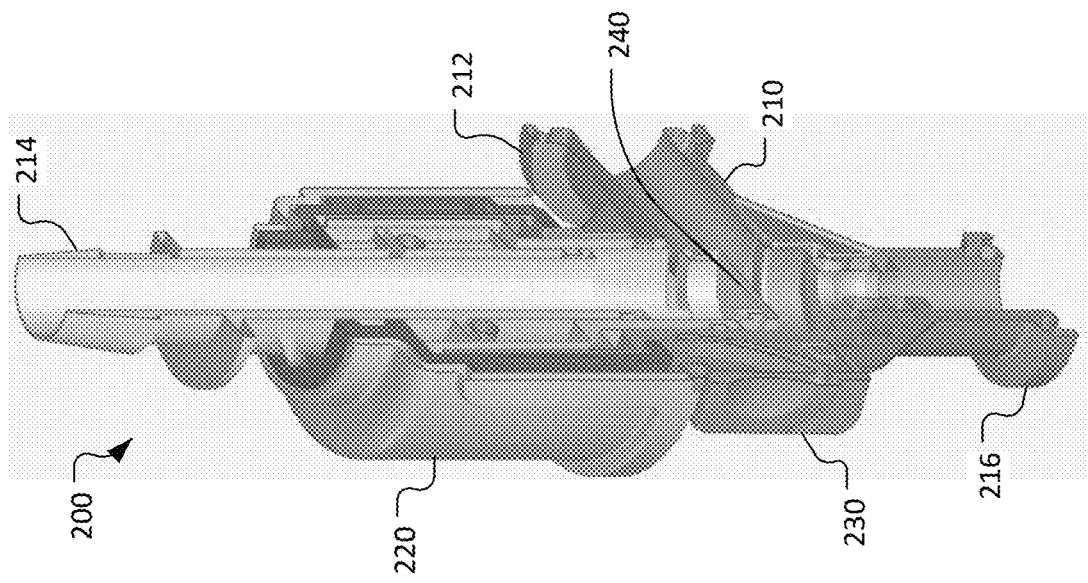
FIG. 8 is a longitudinal cross-sectional view of the fluid coupling of FIG. 7.
Figure 7:
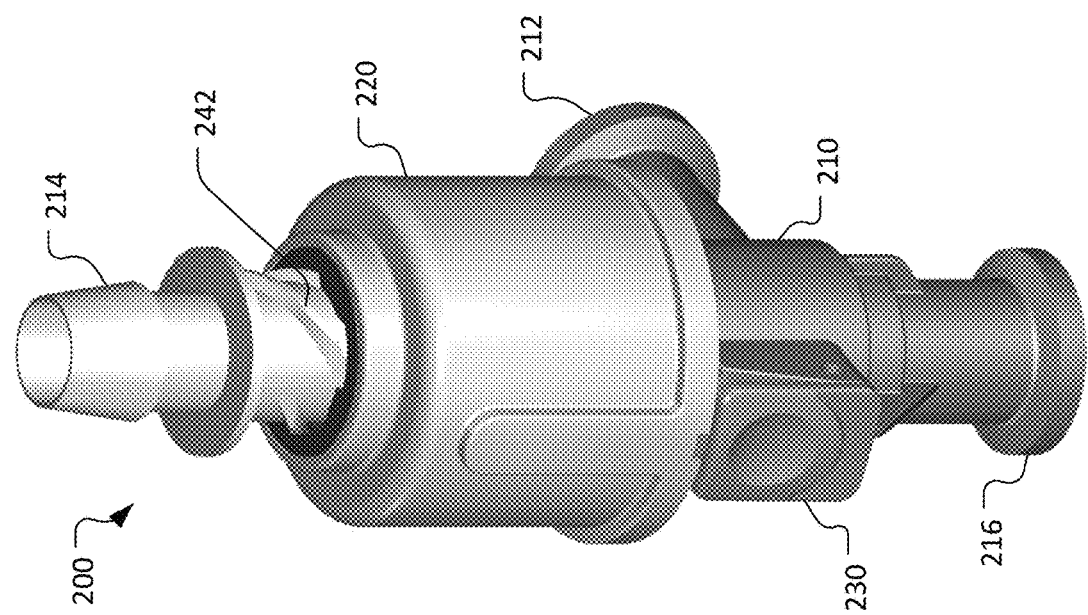
FIG. 7 is a second perspective view of the fluid coupling of FIG. 5.
Figure 10:
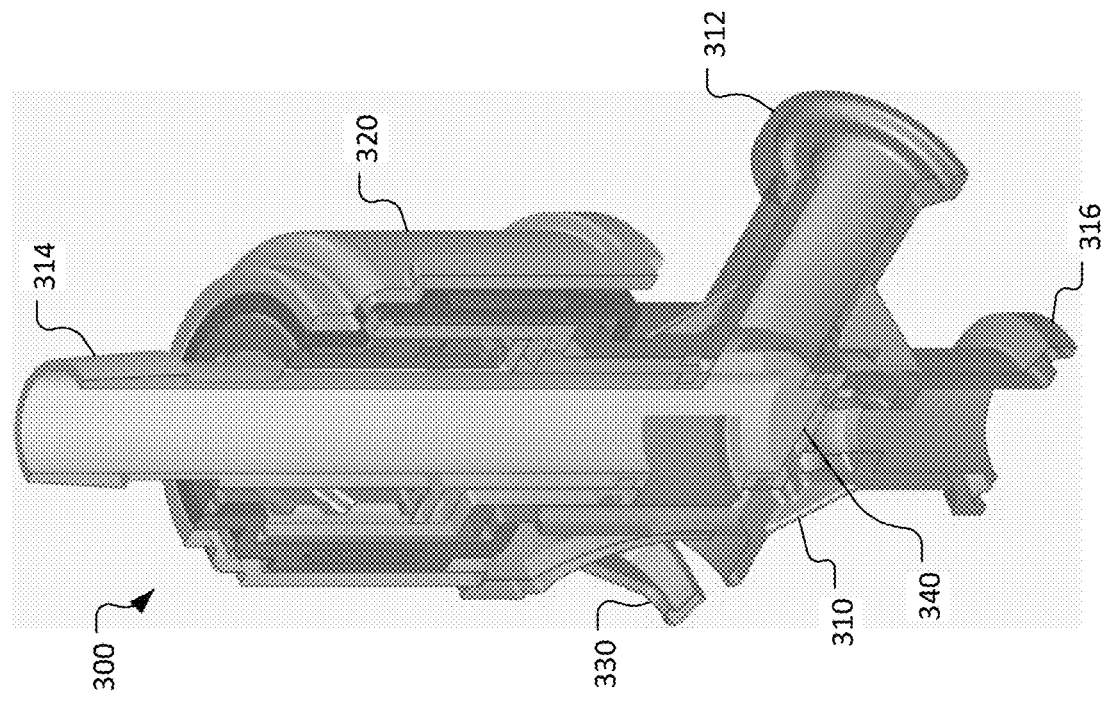
FIG. 10 is a longitudinal cross-sectional view of the fluid coupling of FIG. 9.
Figure 9:
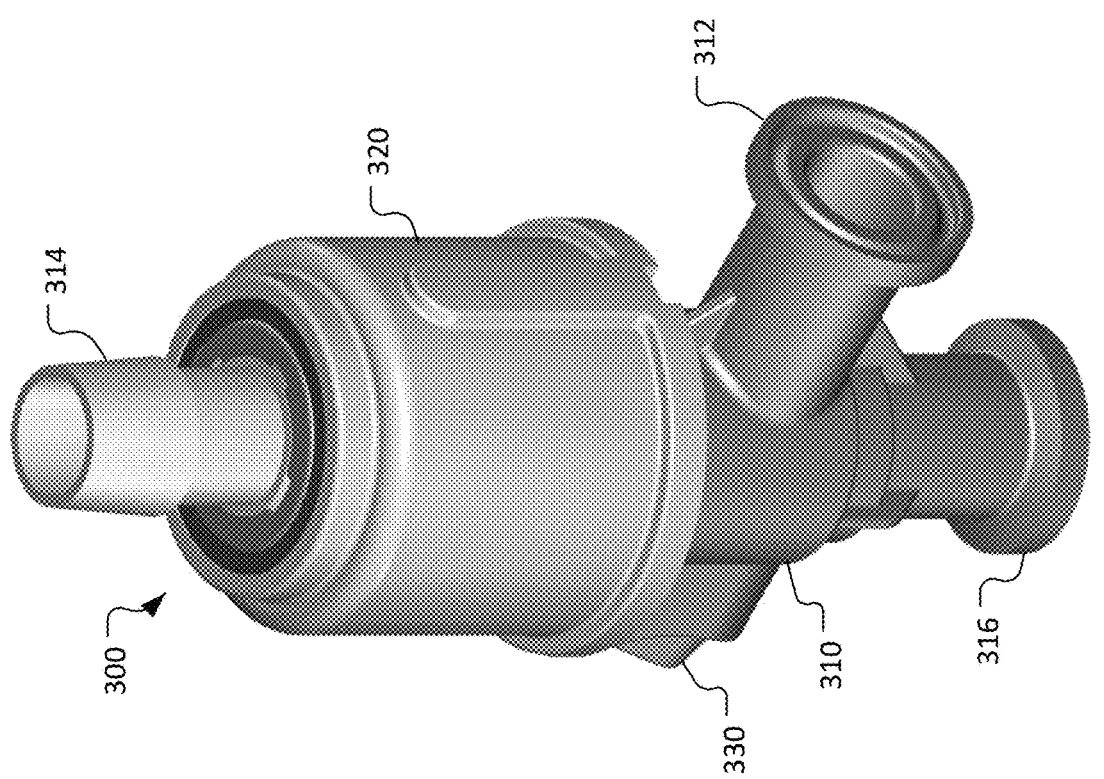
FIG. 9 is a first perspective view of another example fluid coupling in accordance with some embodiments provided herein.
Figure 12:
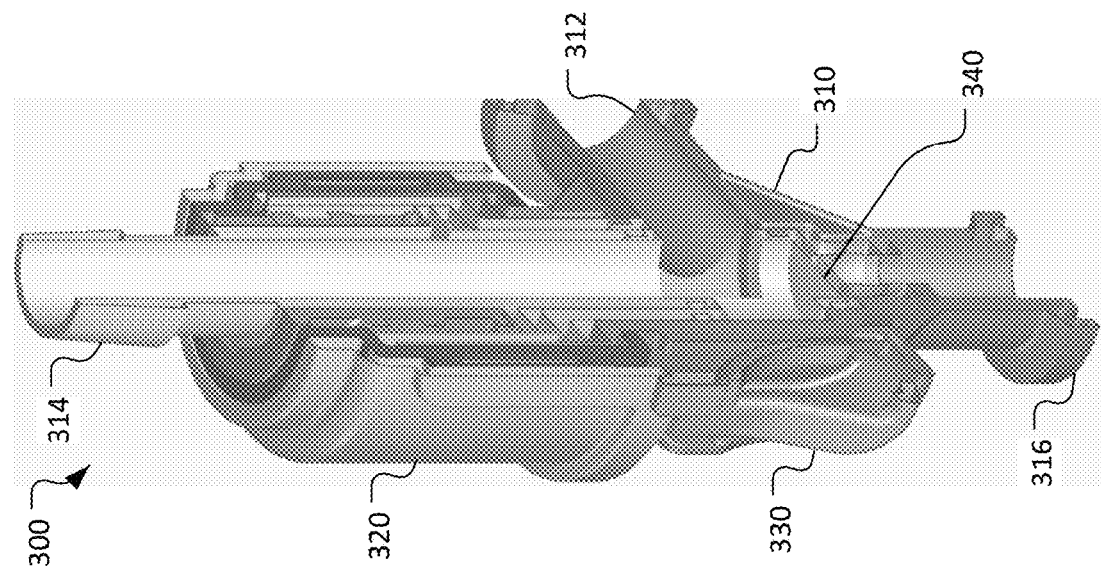
FIG. 12 is a longitudinal cross-sectional view of the fluid coupling of FIG. 11.
Figure 11:
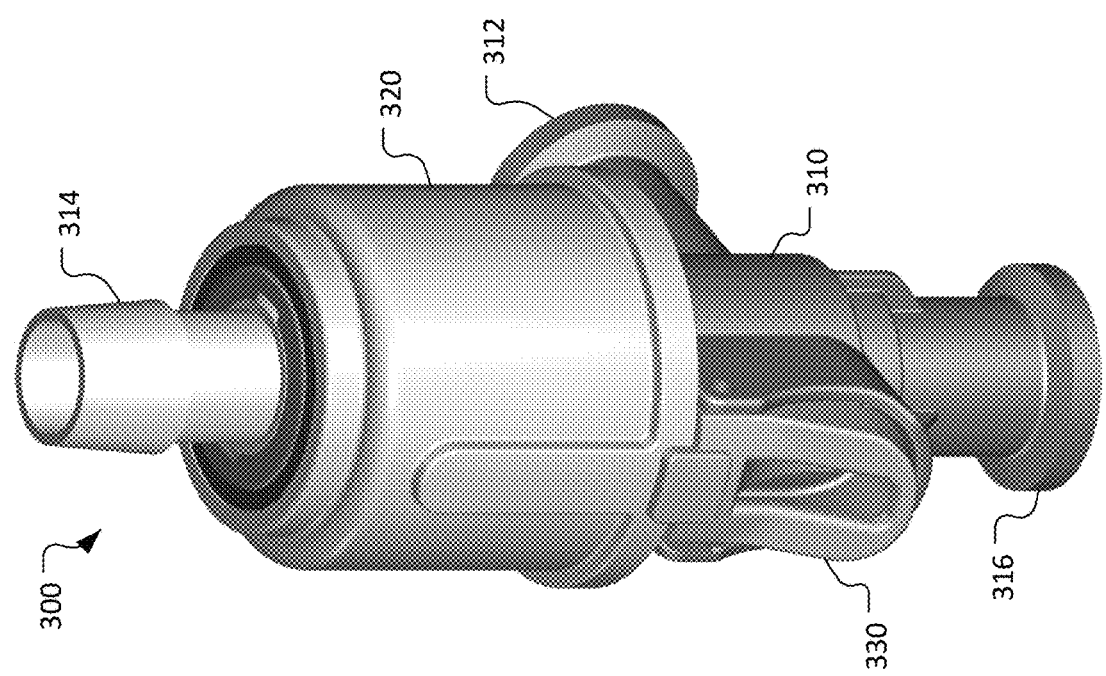
FIG. 11 is a second perspective view of the fluid coupling of FIG. 9.

This document describes fluid handling couplings. For example, this document describes fluid handling couplings that include manually openable valves, and that are configured for single-use aseptic fluid handling usage contexts.

FIGS. 1-4 show a first example fluid coupling device 100. In one example, the fluid coupling device 100 can be used for connecting bioprocessing equipment with a media source and with a steam trap.

The materials from which one or more of the components of the fluid coupling device 100 (and other fluid coupling devices described herein) can be made include thermoplastics. In particular embodiments, the materials from which the components of the fluid coupling device 100 are made of are thermoplastics, such as, but not limited to, acetal, polycarbonate, polysulfone, polyether ether ketone, polysulphide, polyester, polyvinylidene fluoride (PVDF), polyethylene, polyphenylsulfone (PPSU; e.g., Radel®), acrylonitrile butadiene styrene (ABS), polyetherimide (PEI; e.g., Ultem®), polypropylene, polyphenylene, polyaryletherketone, and the like, and combinations thereof. In some embodiments, the thermoplastics can include one or more fillers such as, but not limited to, glass fiber, glass bead, carbon fiber, talc, etc.

In some embodiments, the materials from which one or more of the components of the fluid coupling device 100 are made of include metals such as, but not limited to copper, stainless steel, brass, aluminum, plated steel, zinc alloys, spring steel, and the like. In particular embodiments, the fluid coupling device 100 is metallic-free.

In some embodiments, as described further below, the fluid coupling device 100 can include one or more seal members. In some embodiments, the seal members of the fluid coupling device 100 (and the other fluid couplings described herein) can comprise materials such as, but not limited to, silicone, fluoroelastomers (FKM), ethylene propylene diene monomer (EPDM), thermoplastic elastomers (TPE), bung, buna-N, thermoplastic vulcanizates (TPV), and the like. The cross-sectional shape of such seal members can be circular, D-shaped, X-shaped, hourglass shaped, square, rectangular, U-shaped, multi-lobed, L-shaped, V-shaped, and the like, or any other suitable shape, without limitation.

The fluid coupling device 100 includes a main body 110, a collar 120, a latch 130, and a valve member 140. The latch member 130 releasably detains the collar 120 to the main body 110. When the latch member 130 is activated by a user (e.g., depressed), the collar 120 is free to be rotated relative to the main body 110. Rotation of the collar 120 relative to the main body 110 moves the valve member 140.

The main body 110 includes a first termination 112, a second termination 114, and a third termination 116. In some scenarios of using the fluid coupling device 100, the first termination 112 is releasably coupled to a bioreactor, the second termination 114 is releasably coupled to a media source (e.g., a bag), and the third termination 116 is coupled to a steam trap. The terminations 112/114/116 can also be referred to herein as fluid conduit connection locations.

In the depicted configuration, the valve member 140 is positioned so that the first termination 112 is in fluid communication with the second termination 114, but the third termination 116 is dead-ended.

By depressing the latch 130 and then rotating the collar 120, the valve member 140 will become repositioned so that the first termination 112 is in fluid communication with the third termination 116, but the second termination 114 is dead-ended. In the depicted embodiment, when the collar 120 is rotated the length of the fluid coupling device 100 between the second termination 114 and the third termination 116 does not change.

FIGS. 5-8 show a second example fluid coupling device 200 that can be used for connecting bioprocessing equipment with a media source and with a steam trap.

The fluid coupling device 200 includes a main body 210, a collar 220, a latch 230, and a valve member 240. The latch member 230 releasably detains the collar 220 to the main body 210. When the latch member 230 is activated by a user (e.g., depressed), the collar 220 is free to be rotated relative to the main body 210. Rotation of the collar 220 relative to the main body 210 moves the valve member 240.

The main body 210 includes a first termination 212, a second termination 214, and a third termination 216. In some scenarios of using the fluid coupling device 200, the first termination 212 is releasably coupled to a bioreactor, the second termination 214 is releasably coupled to a media source (e.g., a bag), and the third termination 216 is coupled to a steam trap.

In the depicted configuration, the valve member 240 is positioned so that the first termination 212 is in fluid communication with the third termination 216, but the second termination 214 is dead-ended.

By depressing the latch 230 and then rotating the collar 220, the valve member 240 will become repositioned so that the first termination 212 is in fluid communication with the second termination 214, but the third termination 216 is dead-ended. The valve member 240 includes threads 242 that result in longitudinal movement of the valve member 240 when the collar 220 is rotated relative to the main body 210.

The function of the depicted fluid coupling device 200 is analogous to that of the fluid coupling device 100 except that rotations of the collar 220 do increase or decrease the length of the depicted fluid coupling device between its second termination 214 and third termination 216.

FIGS. 9-12 show a third example fluid coupling device 300 that can be used for connecting bioprocessing equipment with a media source and with a steam trap.

The fluid coupling device 300 includes a main body 310, a collar 320, a latch 330, and a valve member 340. The latch member 330 releasably detains the collar 320 to the main body 310. When the latch member 330 is activated by a user (e.g., depressed), the collar 320 is free to be rotated relative to the main body 310. Rotation of the collar 320 relative to the main body 310 moves the valve member 340.

The main body 310 includes a first termination 312, a second termination 314, and a third termination 316. In some scenarios of using the fluid coupling device 300, the first termination 312 is releasably coupled to a bioreactor, the second termination 314 is releasably coupled to a media source (e.g., a bag), and the third termination 316 is coupled to a steam trap.

In the depicted configuration, the valve member 340 is positioned so that the first termination 312 is in fluid communication with the second termination 314, but the third termination 316 is dead-ended.

By depressing the latch 330 and then rotating the collar 320, the valve member 340 will become repositioned so that the first termination 312 is in fluid communication with the third termination 316, but the first termination 314 is dead-ended.

The function of the depicted fluid coupling device 300 is analogous to that of the fluid coupling device 100 except that rotations of the collar 320 do increase or decrease the length of the depicted fluid coupling device 300 between its second termination 314 and third termination 316.

Figure 15:
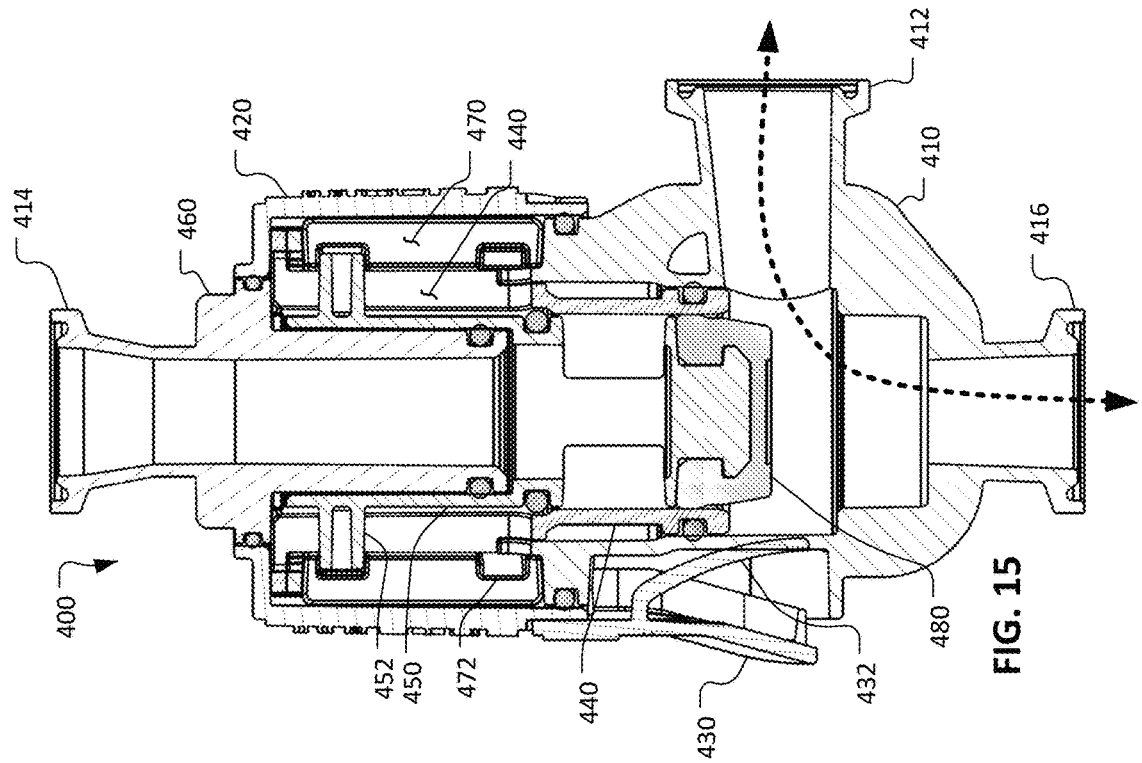
FIG. 15 is a longitudinal cross-sectional view of the fluid coupling of FIG. 13 in a second configuration.
Figure 14:
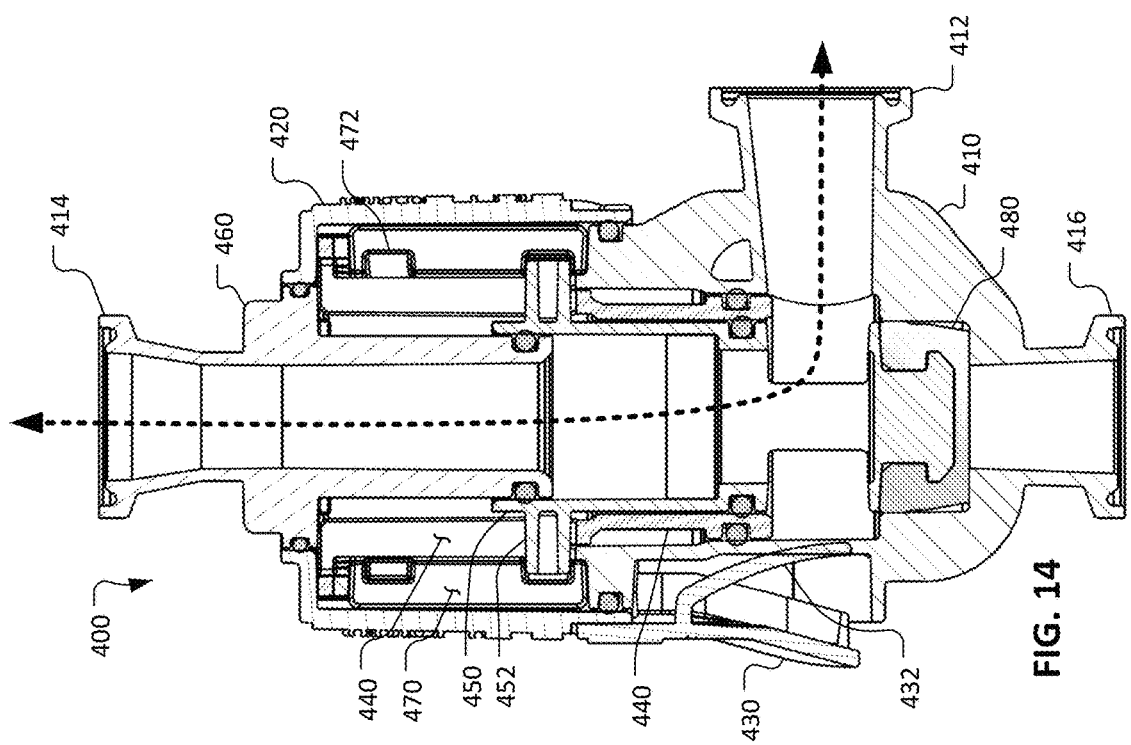
FIG. 14 is a longitudinal cross-sectional view of the fluid coupling of FIG. 13 in a first configuration.

FIGS. 13-15 show a fourth example fluid coupling device 400. In one example context, the fluid coupling device 400 can be used for connecting bioprocessing equipment with a media source and with a steam trap.

The fluid coupling device 400 includes a main body 410, a collar 420, a latch member 430, a guide sleeve 440, a valve member 450, a termination body 460, two rotary drivers 470, and a seal 480. In some embodiments, one or more of those components can be combined with each other as unitary component parts.

The main body 410 includes a first termination 412 and a second termination 416. The termination body 460 includes a third termination 414. In some scenarios of using the fluid coupling device 400, the first termination 412 is releasably coupled to a bioreactor, the third termination 414 is releasably coupled to a media source (e.g., a bag), and the second termination 416 is coupled to a steam trap. The first termination 412, the third termination 414, and the second termination 416 can also be referred to herein as fluid conduit connection locations 412/414/416. The fluid conduit connection locations 412/414/416, while depicted here as sanitary fittings, can be any type of connection such as, but not limited to, barbed, compression, threaded, nipples, tapered pipe threads, ball-in-groove, T-fittings, elbow fittings, and the like, and combinations thereof (e.g., the fluid conduit connection locations 412/414/416 can be configured differently than each other in some embodiments).

The latch member 430 releasably detains the collar 420 to the main body 410. When the latch member 430 is activated by a user (e.g., depressed to disengage it from the collar 420), the collar 420 is free to be rotated relative to the main body 410. Rotation of the collar 420 relative to the main body 410 moves the valve member 440 (translates the valve member 440) between a first configuration as shown in FIG. 14 and a second configuration as shown in FIG. 15.

In the first configuration (FIG. 14), the valve member 440 is positioned so that the first termination 412 is in fluid communication with the third termination 414, but the second termination 416 is dead-ended. By depressing the latch 430 and then rotating the collar 420, the valve member 440 will become repositioned to the second configuration (FIG. 15) so that the first termination 412 is in fluid communication with the second termination 416, but the first termination 414 is dead-ended.

The function of the depicted fluid coupling device 400 is analogous to that of the fluid coupling device 100. Rotations of the collar 420 do not increase or decrease the length of the depicted fluid coupling device 400 between its third termination 414 and second termination 416.

Figure 17:
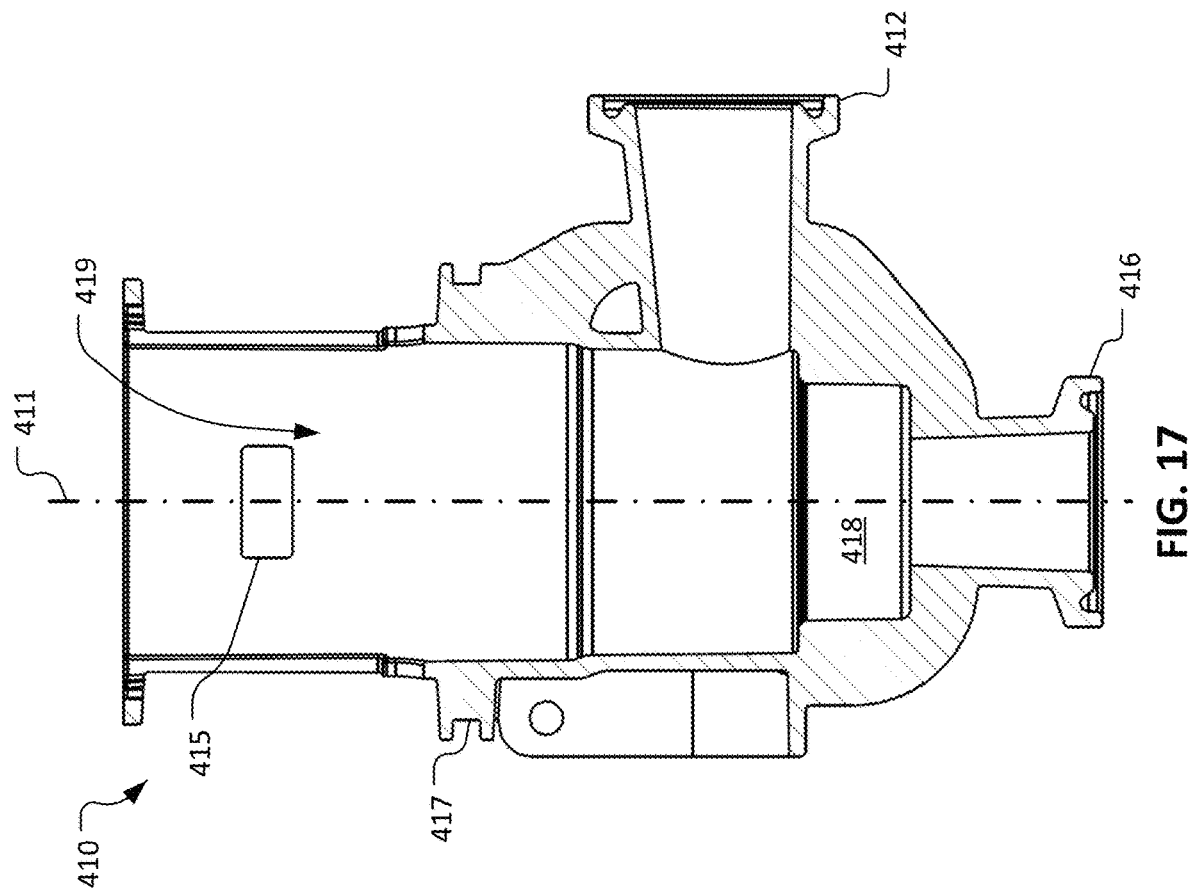
FIG. 17 is a longitudinal cross-sectional view of the main body of FIG. 16.
Figure 16:
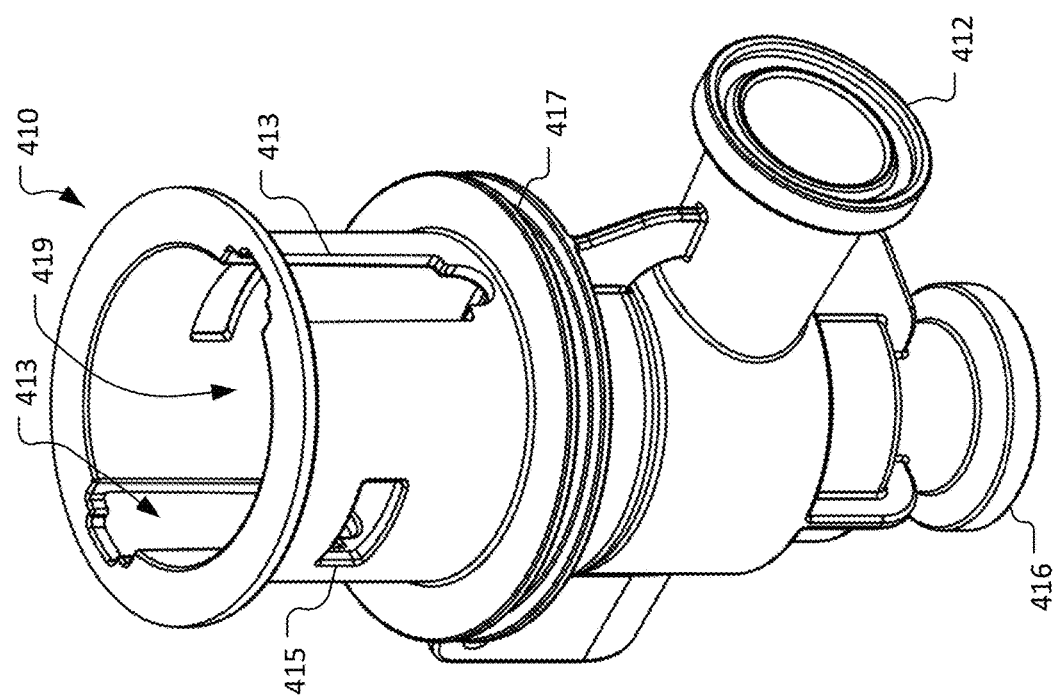
FIG. 16 is a perspective view of a main body of the fluid coupling of FIG. 13.
Figure 23:
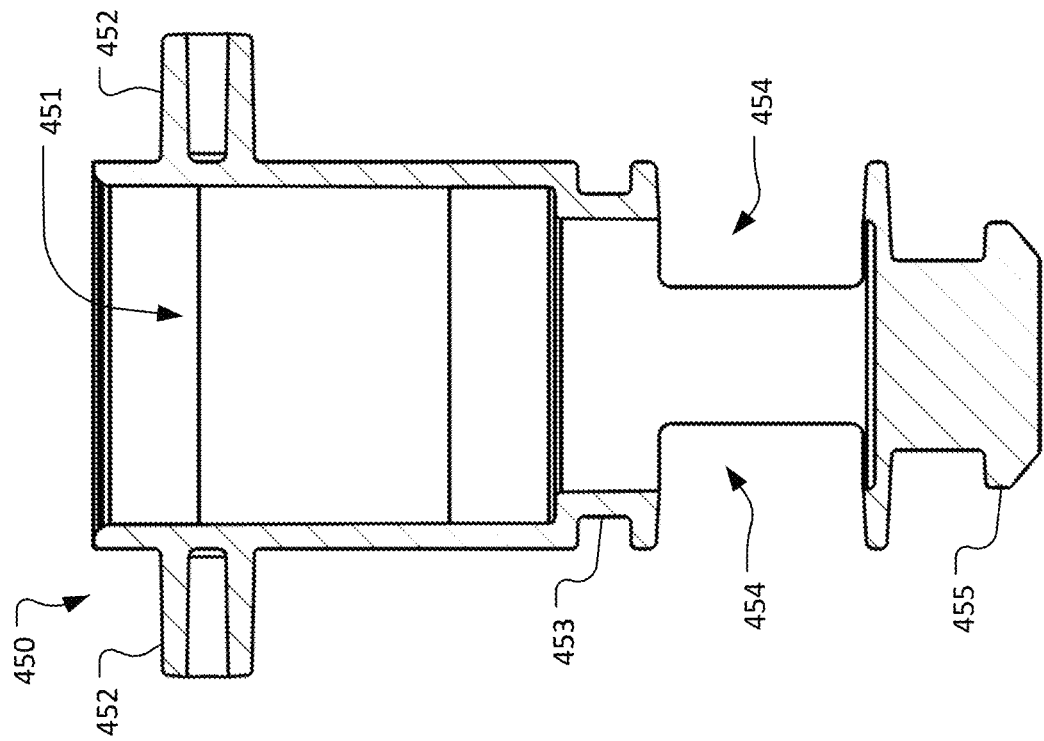
FIG. 23 is a longitudinal cross-sectional view of the valve member of FIG. 22.
Figure 22:
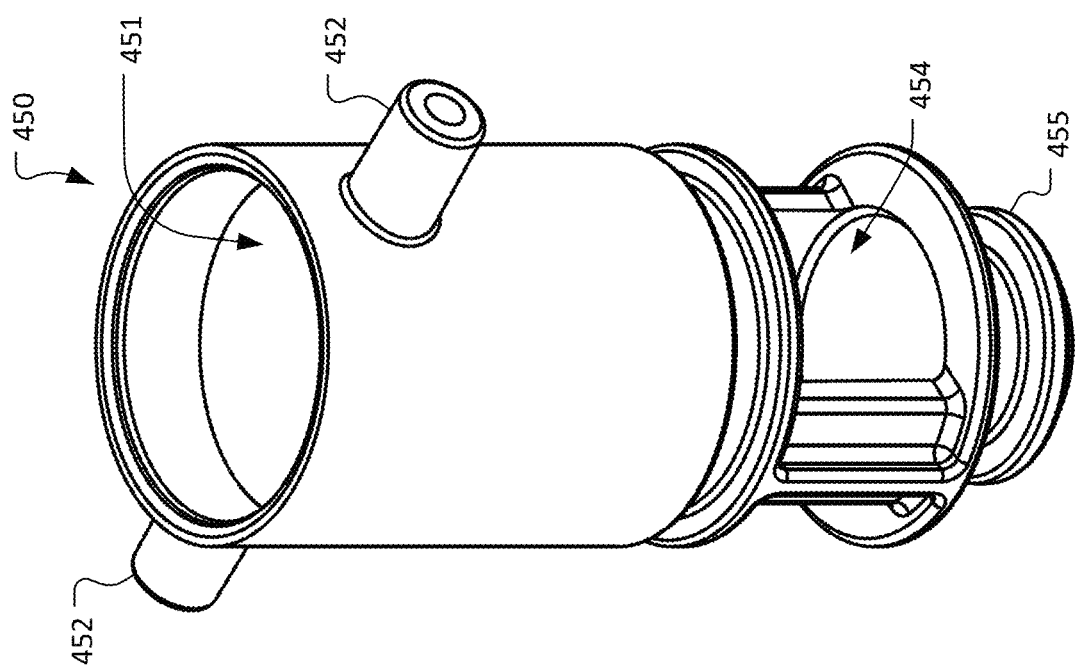
FIG. 22 is a perspective view of a valve member of the fluid coupling of FIG. 13.
Figure 27:
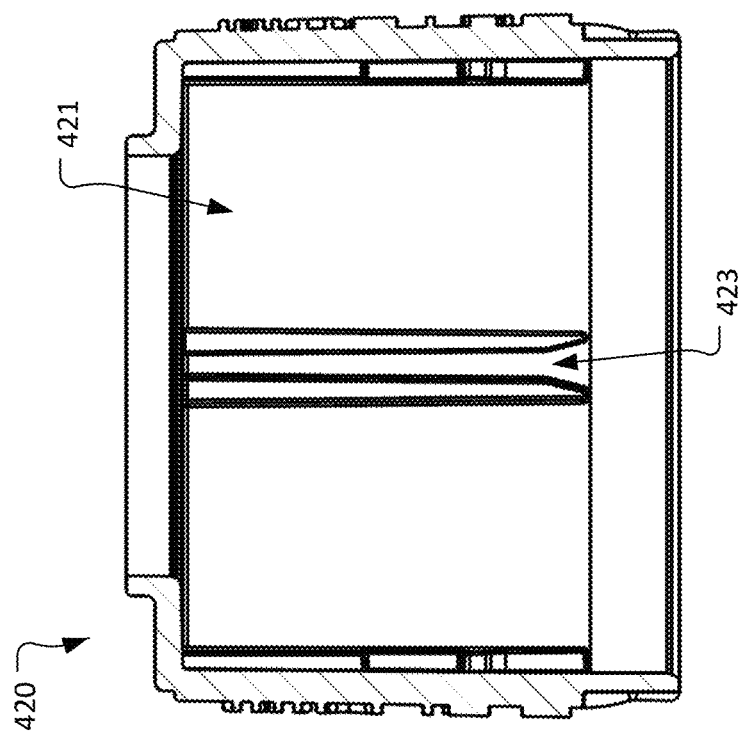
FIG. 27 is a longitudinal cross-sectional view of the collar of FIG. 26.
Figure 26:
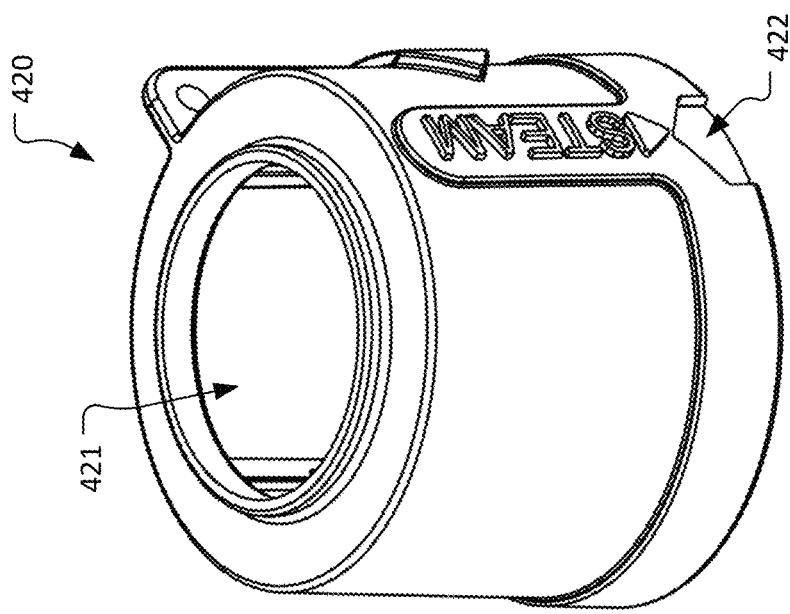
FIG. 26 is a perspective view of a collar of the fluid coupling of FIG. 13.

FIGS. 16-29 illustrate the components of the fluid coupling device 400 in isolation so that their structures are more clearly visible. FIGS. 16 and 17 illustrate the main body 410. FIGS. 18 and 19 illustrate the guide sleeve 440. FIGS. 20 and 21 illustrate the termination body 460. FIGS. 22 and 23 illustrate the valve member 450. FIGS. 24 and 25 illustrate one of two rotary drivers 470. FIGS. 26 and 27 illustrate the collar 420. FIGS. 28 and 29 illustrate the seal 480.

As shown in FIGS. 16 and 17, the main body 410 defines an open internal space 419, a longitudinal axis 411, one or more (two in this example) longitudinally extending wall slots 413, one or more (two in this example) openings 415, an annular seal recess 417, and a valve seat 418.

As shown in FIGS. 18 and 19, the guide sleeve 440 defines an open internal space 441, a flange 446, one or more (two in this example) flange openings 442, one or more (two in this example) sidewall openings 443, two snap-in arms 444, one or more (two in this example) longitudinally extending wall slots 445, and an annular seal recess 447. The two longitudinally extending wall slots 445 extend into the flange 446. Each of the two longitudinally extending wall slots 445 are partially defined by two longitudinally extending outward protrusions 448.

As shown in FIGS. 20 and 21, the termination body 460 includes the first termination 414 and two snap-in arms 462. The termination body 460 also defines an open internal space 461, a first annular seal recess 463 and a second annular seal recess 464.

As shown in FIGS. 22 and 23, the valve member 450 includes one or more (two in the depicted example) radially extending projections 452 and a seal mounting structure 455. The valve member 450 defines an open internal space 451, an annular seal recess 453, and one or more (two in this example) sidewall openings 454.

As shown in FIGS. 24 and 25, a single one of the rotary drivers 470 is semi-cylindrical. In the depicted embodiment, two of the rotary drivers 470 are included in the fluid coupling device 400. In the assembled fluid coupling device 400, the two rotary drivers 470 are arranged next to each other to form a cylinder that defines an open internal space 471. Accordingly, two of the rotary drivers 470, as arranged in the assembled fluid coupling device 400 can also be referred to herein as an open cylindrical rotary driver 470. The inner wall of each of the rotary drivers 470 defines a spirally extending groove 472. The open cylindrical rotary driver 470 defines two such spirally extending grooves 472. In some embodiments, the grooves 472 extend along a helical path. In some embodiments, the grooves 472 may also include non-helical portions. Each of the rotary drivers 470 also includes two longitudinally extending flanges 473.

As shown in FIGS. 26 and 27, the collar 420 defines an open internal space 421, two latch engagement recesses 422, and one or more (two in this example) longitudinally extending slots 423. The outer wall of the collar 420 also includes markings that inform a user of the configuration of the valve member 450 and that indicate the direction to rotate the collar 420 to reconfigure the valve member 450.

As shown in FIGS. 28 and 29, the seal 480 includes an open internal space 481, a frustoconical outer wall 482, an annular contoured projection 483, and a front face 484. The fluid coupling device 400 includes five (5) additional seals that are located in the seal recesses 417, 447, 463, 464, and 453.

In its assembled form, the fluid coupling device 400 can have at least the following interrelationships between its components.

In some embodiments, there are one or more seals between the valve member 450 and the termination body 460. For example, in the depicted embodiment there is a seal in the annular seal recess 463 of the termination body 460. The seal in the annular seal recess 463 of the termination body 460 seals against the inner wall of the valve member 450 as the valve member 450 longitudinally translates between the first configuration (FIG. 14) and the second configuration (FIG. 15).

In some embodiments, there are one or more seals between the valve member 450 and the guide sleeve 440. For example, in the depicted embodiment there is a seal in the annular seal recess 453 of the valve member 450. The seal in the annular seal recess 453 of the valve member 450 seals against the inner wall of the guide sleeve 440 as the valve member 450 longitudinally translates between the first configuration (FIG. 14) and the second configuration (FIG. 15).

In some embodiments, there are one or more seals between the main body 410 and the guide sleeve 440. For example, in the depicted embodiment there is a seal in the annular seal recess 447 of the guide sleeve 440 that seals against an inner wall of the main body 410.

In some embodiments, there are one or more seals between the collar 420 and the main body 410. For example, in the depicted embodiment there is a seal in the annular seal recess 417 of the main body 410 that seals against an inner wall of the collar 420. This provides an environmental seal while allowing the collar 420 to be rotated relative to the main body 410.

In some embodiments, there are one or more seals between the collar 420 and the termination body 460. For example, in the depicted embodiment there is a seal in the annular seal recess 464 of the termination body 460 that seals against an inner wall of the collar 420. This provides an environmental seal while allowing the collar 420 to be rotated relative to the termination body 460.

The fluid coupling device 400 also includes the seal 480. In the depicted embodiment, the open internal space 481 of the seal 480 is shaped to receive and fixedly engage with the seal mounting structure 455 of the valve member 450. When the valve member 450 is in its first configuration (FIG. 14), the seal 480 seals within the valve seat 418 and dead ends the second termination 416. In addition, when the valve member 450 is in the first configuration, both a front face 484 of the seal 480 (FIG. 29) and an outer diameter (the annular contoured projection 483) of the seal 480 make contact with and seal against surfaces of the main body 410 that define the valve seat 418.

When the valve member 450 is in its second configuration (FIG. 15), the seal 480 seals against the inner diameter of the guide sleeve 440. In particular, the annular contoured projection 483 of the seal 480 seals against the inner diameter of the guide sleeve 440 when the valve member 450 is in its second configuration.

In some embodiments, the collar 420 and the two rotary drivers 470 are fixedly coupled to each other. For example, in the depicted embodiment the two longitudinally extending flanges of each of the two rotary drivers 470 are captured within two longitudinally extending slots 423 in the open internal space 421 of the collar 420.

In some embodiments, the valve member 450 and the guide sleeve 440 are movably coupled to each other. For example, in the depicted embodiment the two radially extending projections 452 are movably coupled with the two longitudinally extending wall slots 445 of the guide sleeve 440. The two radially extending projections 452 slidably translate along within the two longitudinally extending wall slots 445 of the guide sleeve 440 as the valve member 450 reconfigures between its first and second configurations.

In some embodiments, the guide sleeve 440 is immovably coupled to the main body 410. Other terms for "immovably coupled" can include directly affixed, fixedly coupled, permanently attached, etc. In some embodiments, the guide sleeve 440 and the main body 410 are a single unitary component part. In the depicted embodiment, the two longitudinally extending radial protrusions 448 extend into engagement with the two longitudinally extending wall slots 413 of the main body 410. In addition, in the depicted embodiment the two snap-in arms 444 of the guide sleeve 440 are snapped into engagement with the two openings 415 of the main body 410.

In the depicted embodiment, the two radially extending projections 452 radially extend through both: (i) the two longitudinally extending wall slots 445 of the guide sleeve 440 and (ii) the two longitudinally extending wall slots 413 of the main body 410. After extending through the slots 445 and 413, end portions of the two radially extending projections 452 extend into the spirally extending grooves 472 of the open cylindrical rotary driver 470.

In some embodiments, the termination body 460 is coupled to the guide sleeve 440. In the depicted embodiment, the two snap-in arms 462 of the termination body 460 extend through the two flange openings 442 of the guide sleeve 440 and are snapped into engagement with the two sidewall openings 443 of the guide sleeve 440.

In some embodiments, the latch member 430 is movably coupled with the collar 420 and is releasably coupleable with the main body 410. In some embodiments, the latch member 430 is movably coupled with the main body 410 and is releasably coupleable with the collar 420. For example, in the depicted embodiment, the latch member 430 is pivotably coupled with the main body 410 and releasably coupleable with the collar 420. In particular, the latch member 430 is pivotably reconfigurable between a latched configuration and an unlatched configuration. The latch member 430 can be pivoted from the latched configuration to the unlatched configuration by a user who manually actuates the latch member 430, such as by radially depressing a thumb pad of the latch member 430. The latch member 430 can be pivoted from the unlatched configuration to the latched configuration by a force from a spring (e.g., cantilevered spring, coil spring, leaf spring, etc.) that spring biases the latch member 430 toward its latched configuration. In the depicted embodiment, a cantilevered spring 432 (FIGS. 14 and 15) is included for this purpose.

In order to rotate the collar 420 to reconfigure the valve member 450 between its first and second configurations, the latch member 430 is first pivoted to its unlatched configuration. With the latch member 430 being held in its unlatched configuration, the collar 420 can then be manually rotated to reconfigure the valve member 450 between its first and second configurations.

Further details regarding the latch member 430 are as follows. An end portion of the latch member 430 releasably engages within one of the two latch engagement recesses 422 of the collar 420. The two latch engagement recesses 422 of the collar 420 are respectively located to correspond with: (i) the first configuration of the valve member 450 and (ii) the second configuration of the valve member 450. Accordingly, when the end portion of the latch member 430 is releasably engaged within a first one of the two latch engagement recesses 422 of the collar 420, the valve member 450 is positioned within its first configuration (FIG. 14), and when the end portion of the latch member 430 is releasably engaged within a second one of the two latch engagement recesses 422 of the collar 420, the valve member 450 is positioned within its second configuration (FIG. 15). In some embodiments, other types of latches can be included rather than the pivotable latch member 430. For example, in some embodiments a sliding latch can be included.

In the depicted embodiment, outermost end portions of each of the two radially extending projections 452 of the valve member 450 extend into the spirally extending grooves 472 of the open cylindrical rotary driver 470. The end portions of the two radially extending projections 452 are slidably disposed within (movably coupled with) the spirally extending grooves 472 of the open cylindrical rotary driver 470. Accordingly, as the collar 420 is rotated by a user, the rotation of the open cylindrical rotary driver 470 forces the end portions of the two radially extending projections 452 to travel within the spirally extending grooves 472 while the two longitudinally extending wall slots 445 of the guide sleeve 440 simultaneously constrain the two radially extending projections 452 to longitudinal movement only. In this manner, manual rotation of the collar 420 and the open cylindrical rotary driver 470 causes longitudinal translation of the valve member 450 between its first and second configurations.

In the depicted embodiment, a portion of the termination body 460 extends to within (and is movably coupled within) the open internal space 451 of the valve member 450. When the valve member 450 is in its first configuration (FIG. 14), just a short end portion of the termination body 460 extends to within the open internal space 451 of the valve member 450. When the valve member 450 is in its second configuration (FIG. 15), a much longer portion of the termination body 460 extends to within the open internal space 451 of the valve member 450.

In the depicted embodiment, a portion of the valve member 450 is movably coupled within the open internal space 441 of the guide sleeve 440. When the valve member 450 is in its second configuration (FIG. 15), a portion of the valve member 450 that includes the two sidewall openings 454 is located within the open internal space 451 of the termination body 460. In this configuration, the two sidewall openings 454 are fluidly sealed so that no fluid can flow to the third termination 414 from either of the first termination 412 or the second termination 416. When the valve member 450 is in its first configuration (FIG. 14), a mid-body portion of the valve member 450 is located within the open internal space 451 of the termination body 460 and the two sidewall openings 454 are not within the open internal space 451 of the termination body 460. In this configuration, the two sidewall openings 454 are positioned to put the first termination 412 in fluid communication with the third termination 414, and the seal 480 is positioned to block or dead-end the second termination 416 (to fluidly isolate the second termination 416 from the other terminations 412/414).

In the depicted embodiment, the guide sleeve 440 is immovably coupled (directly affixed, fixedly coupled, permanently attached, etc.) to the main body 410 and to the termination body 460. In some embodiments, the guide sleeve 440 and the main body 410 and/or the termination body 460 are a single unitary component part.

In the depicted embodiment, the open cylindrical rotary driver 470 is immovably coupled (directly affixed, fixedly coupled, permanently attached, etc.) to the collar 420. In some embodiments, the open cylindrical rotary driver 470 and the collar 420 are a single unitary component part. In the depicted embodiment, the open cylindrical rotary driver 470 and the collar 420 circumferentially surround a portion of the main body 410 and are rotatable about the portion of the main body 410.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

What is claimed is:

1. A fluid coupling device comprising:
a main body defining: (i) an open internal space, (ii) a valve seat, and (iii) a longitudinal axis, the main body comprising a first fluid conduit connection location and a second fluid conduit connection location;
a termination body comprising a third fluid conduit connection location;
a guide sleeve defining an open internal space, wherein a portion of the guide sleeve is immovably coupled within the open internal space of the main body, and wherein a portion of the termination body is immovably coupled within the open internal space of the guide sleeve, the guide sleeve defining two longitudinally extending wall slots;
a valve member that is reconfigurable between a first configuration and a second configuration, the valve member defining an open internal space and comprising two radially extending projections, wherein a portion of the termination body is movably coupled within the open internal space of the valve member;
a seal attached to an end portion of the valve member and configured to seal within the valve seat of the main body when the valve member is in the first configuration and within the open internal space of the guide sleeve when the valve member is in the second configuration; and an open cylindrical rotary driver disposed around a portion of the main body and being rotatable around the portion of the main body, an inner wall of the open cylindrical rotary driver defining two spiral grooves that spirally extend along the inner wall of the open cylindrical rotary driver, wherein the two radially extending projections of the valve member extend through the two longitudinally extending wall slots of the guide sleeve and are slidably disposed within the two spiral grooves of the open cylindrical rotary driver.

2. The fluid coupling device of claim 1, further comprising a collar immovably coupled with the open cylindrical rotary driver and being rotatable around the portion of the main body.

3. The fluid coupling device of claim 2, further comprising a latch member that is: (i) movably coupled with the main body, (ii) releasably coupleable with the collar, and (iii) reconfigurable between a latched position that prevents reconfiguration of the valve member and an unlatched position that allows reconfiguration of the valve member.

4. The fluid coupling device of claim 3, wherein the collar defines two latch engagement recesses that are configured to releasably receive a portion of the latch member when the latch member is in the latched position.

5. The fluid coupling device of claim 4, wherein a location of a first latch engagement recess of the two latch engagement recesses corresponds with the first configuration of the valve member, and wherein a location of a second latch engagement recess of the two latch engagement recesses corresponds with the second configuration of the valve member.

6. The fluid coupling device of claim 2, further comprising:
a first seal disposed between the collar and the termination body;
a second seal disposed between the collar and the main body;
a third seal disposed between the termination body and the valve member;
a fourth seal disposed between the valve member and the guide sleeve; and
a fifth seal disposed between the guide sleeve and the main body.

7. The fluid coupling device of claim 1, wherein, when the valve member is in the first configuration, both a front face of the seal and an outer diameter of the seal make contact with and seal against surfaces of the main body that define the valve seat.

8. The fluid coupling device of claim 1, wherein the valve member is movably coupled within the open internal space of the guide sleeve.

9. The fluid coupling device of claim 1, wherein, while the valve member is in its first configuration, the first fluid conduit connection location is in fluid communication with the third fluid conduit connection location and the second fluid conduit connection location is dead-ended.

10. The fluid coupling device of claim 1, wherein, while the valve member is in its second configuration, the first fluid conduit connection location is in fluid communication with the second fluid conduit connection location and the third fluid conduit connection location is dead-ended.

11. The fluid coupling device of claim 1, wherein the main body defines two longitudinally extending wall slots, and wherein the two radially extending projections of the valve member extend through the two longitudinally extending wall slots of the main body.

12. A fluid coupling device comprising:
a main body defining: (i) an open internal space, (ii) a valve seat, and (iii) a longitudinal axis, the main body comprising a first fluid conduit connection location and a second fluid conduit connection location;
a guide sleeve defining an open internal space and one or more longitudinally extending wall slots;
a valve member that is reconfigurable between a first configuration and a second configuration, the valve member defining an open internal space and comprising one or more radially extending projections;
a seal attached to an end portion of the valve member and configured to seal within the valve seat of the main body when the valve member is in the first configuration and within the open internal space of the guide sleeve when the valve member is in the second configuration; and
an open cylindrical rotary driver that is rotatable relative to the main body, the open cylindrical rotary driver defining one or more spiral grooves,
wherein the one or more radially extending projections of the valve member extend through the one or more longitudinally extending wall slots of the guide sleeve and are slidably disposed within the one or more spiral grooves of the open cylindrical rotary driver.

13. The fluid coupling device of claim 12, further comprising a termination body comprising a third fluid conduit connection location.

14. The fluid coupling device of claim 13, wherein a portion of the termination body is immovably coupled within the open internal space of the guide sleeve.

15. The fluid coupling device of claim 13, wherein a portion of the termination body is movably coupled within the open internal space of the valve member.

16. The fluid coupling device of claim 12, wherein a portion of the guide sleeve is immovably coupled within the open internal space of the main body.

17. The fluid coupling device of claim 12, further comprising a latch member that is: (i) movably coupled with the main body and (ii) reconfigurable between a latched position and an unlatched position.

18. The fluid coupling device of claim 17, further comprising a collar immovably coupled with the open cylindrical rotary driver and defining two latch engagement recesses that are configured to releasably receive a portion of the latch member when the latch member is in the latched position.

19. The fluid coupling device of claim 12, wherein the valve member is movably coupled within the open internal space of the guide sleeve.

20. The fluid coupling device of claim 12, wherein rotation of the open cylindrical rotary driver are configured to drive longitudinal translations of the valve member between the first and second configurations of the valve member.

* * * * *